United States Patent [19]
Cappellotto

[11] Patent Number: 5,887,511
[45] Date of Patent: Mar. 30, 1999

[54] VESSEL PROVIDED WITH AN EMULSIFYING-FOAMING DEVICE FOR MAKING CAPPUCCINO'S, WHIPPED CREAM AND THE LIKE

[75] Inventor: Walter Cappellotto, Milan, Italy

[73] Assignee: Vev Inox Industria Casalinghi S.P.A., Nibionno, Italy

[21] Appl. No.: 947,640

[22] Filed: Oct. 9, 1997

[30] Foreign Application Priority Data

Oct. 23, 1996 [IT] Italy .................................. BS96A0085

[51] Int. Cl.⁶ ....................................................... A47J 31/00
[52] U.S. Cl. .............................. 99/287; 99/323.1; 99/275; 366/137
[58] Field of Search ...................................... 99/287, 323.1, 99/275; 366/137, 159.1; 261/33, 31

[56] References Cited

U.S. PATENT DOCUMENTS

| | | |
|---|---|---|
| 810,892 | 1/1906 | Thomas ...................................... 261/31 |
| 1,362,131 | 12/1920 | Norcross ............................. 366/137 X |
| 4,903,585 | 2/1990 | Wimmers et al. ..................... 99/287 X |

*Primary Examiner*—Reginald L. Alexander
*Attorney, Agent, or Firm*—Bucknam and Archer

[57] ABSTRACT

A vessel provided with an emulsifying-foaming device for making cappuccino's, whipped cream and the like comprises a vessel body with a cover element and a circulating pump mounted on the cover element and so arranged as to draw a liquid from a bottom portion of the vessel body and jet discharge the drawn liquid on the top free surface of the liquid in said vessel, in order to provide a forced mixing and aeration of the product.

1 Claim, 1 Drawing Sheet

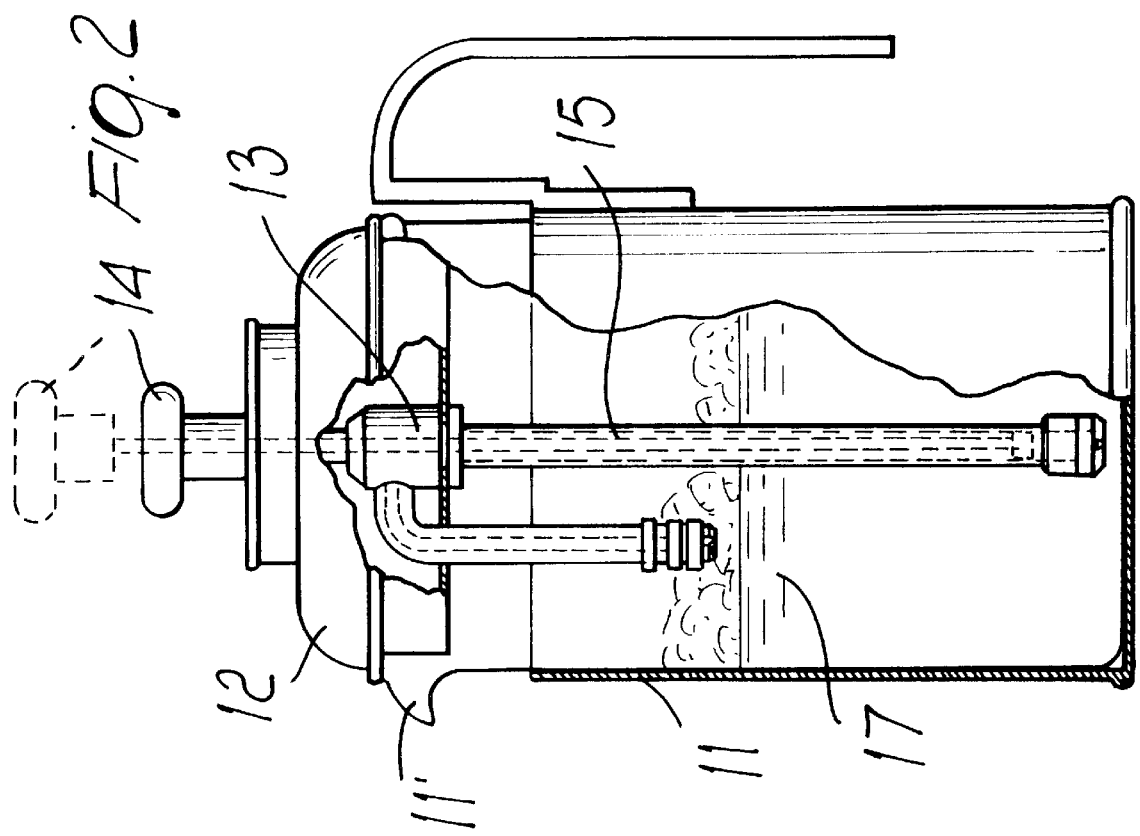
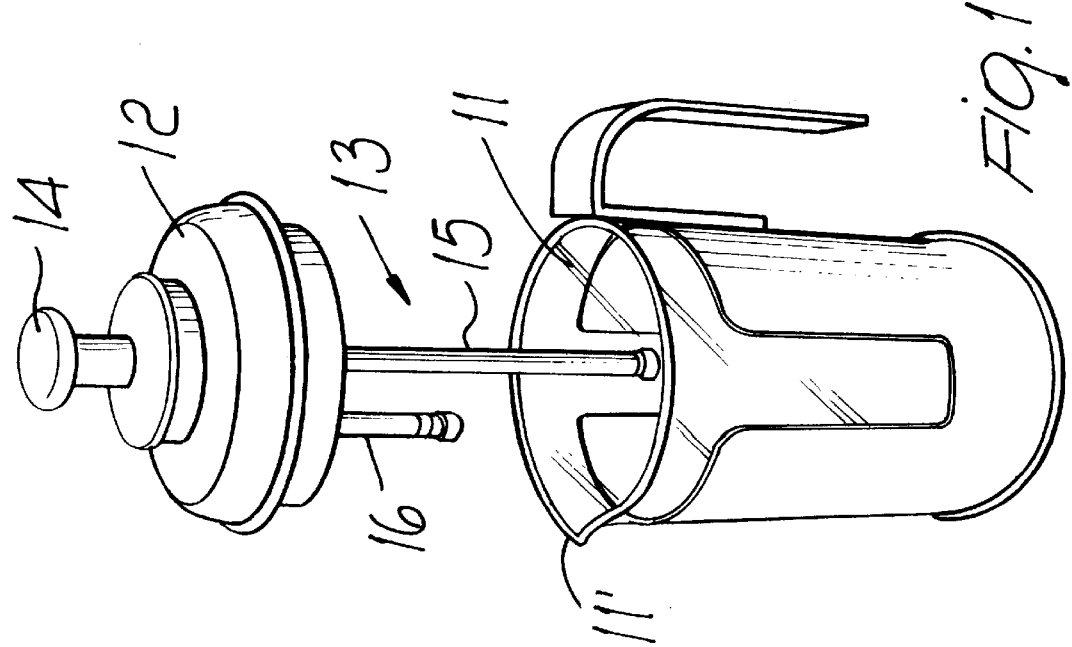

VESSEL PROVIDED WITH AN EMULSIFYING-FOAMING DEVICE FOR MAKING CAPPUCCINO'S, WHIPPED CREAM AND THE LIKE

BACKGROUND OF THE INVENTION

The present invention relates to a vessel provided with an emulsifying-foaming device for making, in a domestic environment, cappuccino's, whipped cream and the like.

Mixing, aerating or emulsifying devices for the above mentioned application are already available. These prior devices substantially comprise a bowl or vessel for holding therein components to be mixed or emulsified and, as a driving member, a perforated and/or finned disc element, which can be reciprocated, like a piston, and possibly rotated in said bowl or vessel.

The driving element is conventionally assembled and guided on a covering element operating as a cover for the vessel, and it operates so as to subject to a stirring action the components in order to introduce into said components a metered amount of air, thereby providing a foamed region arranged on the top of a liquid part.

SUMMARY OF THE INVENTION

The aim of the present invention is to provide such an emulsifying-foaming device which is specifically designed to cause the components held in the vessel to forcibly circulate therein in order to mix said components and emulsify said components by air.

According to the present invention, the above mentioned aim is achieved by providing a vessel including a cover element therefor, with a circulating pump, advantageously of a plunger type, which pump is mounted on the cover and so arranged as to draw liquid material from the bottom of said vessel and discharge said drawn liquid material onto the top free surface of the liquid material itself.

BRIEF DESCRIPTION OF THE DRAWINGS

A preferred embodiment of the invention is illustrated, by way of an indicative, but not limitative, example in the accompanying drawings, where:

FIG. 1 illustrates the subject vessel provided with a cover element and a circulating pump in a separated or exploded condition; and FIG. 2 is a partial cross-sectional view illustrating the subject vessel and the emulsifying-foaming device therefor.

DESCRIPTION OF THE PREFERRED EMBODIMENT

With reference to the above mentioned drawings, at 11 a bowl or vessel is indicated, said vessel including a side pouring spout 11' and a cover 12. Said bowl or vessel can be made of stainless steel or of a thermoresistant glass material, or it can comprise a glass body arranged inside a stainless steel casing. The cover, in turn, can be made of stainless steel or other suitable material and is so designed as to rest on the top rim of the vessel.

In this connection, it should be pointed out that the disclosed assembly is specifically designed for arrangement on a heating source to be heated thereby.

To the cover 12 a circulating pump 13 is removably connected, said pump being advantageously of a plunger type and being driven by a rod element provided with a top knob 14 movably arranged above the cover. The pump 13 is provided with a dipping or drawing pipe element 15 extending near the bottom of the vessel as well as a discharging pipe element 16 ending at a higher level. A suitable unidirectional valve assembly will allow liquid material in said vessel to be drawn or sucked through the drawing pipe element and delivered through the discharging pipe element as the pump is operated.

In operation, the components 17 to be mixed are introduced into the vessel, upon heating said components, if required. Then, by manually operating, for at least two times said pump 13 by gripping the gripping knob 14, liquid material is caused to circulate through the vessel by drawing said liquid through said drawing pipe element and discharging it, in jet form, from said discharging pipe, on the top free surface of the liquid in the vessel. Thus, the liquid will be stirred and strongly mixed by injecting air in said liquid in order to emulsify it and providing on the liquid a foam layer.

Thus, it is possible to make cappuccino's, whipped cream or other types of beverages to be emulsified or foamed.

As it should be apparent from the above disclosure, the subject device can be easily washed by causing water to recirculate through the pump.

I claim:

1. A vessel provided with an emulsifying-foaming device for making cappuccino's and whipped cream comprising a vessel body with a cover therefor, said vessel comprising a circulating pump (13) mounted on said cover and so arranged as to draw a liquid material on a bottom of said vessel body and discharge said liquid material, in a jet form, on a free top surface of said liquid material, for forcibly mixing and aerating said liquid material, said circulating pump being a plunger pump provided with a drawing pipe element (15) and a discharging pipe element (16), said pipe elements including unidirectional suction and delivery valves, said pump being driven by a rod element provided with a gripping knob (14) movably arranged above said cover.

* * * * *